United States Patent
Atsumi et al.

(10) Patent No.: US 9,870,142 B2
(45) Date of Patent: Jan. 16, 2018

(54) DISPLAYING DEVICE WHICH CAN RECEIVE PINCH OUT OPERATION

(71) Applicant: Konica Minolta, Inc., Chiyoda-ku (JP)

(72) Inventors: Tomoyuki Atsumi, Toyohashi (JP);
Kaoru Fukuoka, Amagasaki (JP);
Masao Hosono, Toyokawa (JP);
Takashi Oikawa, Toyohashi (JP);
Tatsuya Kitaguchi, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 286 days.

(21) Appl. No.: 14/480,938

(22) Filed: Sep. 9, 2014

(65) Prior Publication Data
US 2015/0074601 A1 Mar. 12, 2015

(30) Foreign Application Priority Data

Sep. 10, 2013 (JP) .................................. 2013-186972

(51) Int. Cl.
*G06F 3/048* (2013.01)
*G06F 3/0488* (2013.01)
*H04N 1/00* (2006.01)

(52) U.S. Cl.
CPC ..... *G06F 3/04883* (2013.01); *H04N 1/00307* (2013.01); *H04N 1/00392* (2013.01);
(Continued)

(58) Field of Classification Search
CPC ........... H04N 1/00469; H04N 1/00392; H04N 1/00411; H04N 1/00307;
(Continued)

(56) References Cited

U.S. PATENT DOCUMENTS 7,844,915 B2 11/2010 Platzer et al.
9,389,774 B2 7/2016 Sogo
(Continued)

FOREIGN PATENT DOCUMENTS

CN 102486717 A 6/2012
JP 10-269022 A 10/1998
(Continued)

OTHER PUBLICATIONS

Office Action (Notice of Grounds of Rejection) dated Jul. 28, 2015, by the Japanese Patent Office in corresponding Japanese Patent Application No. 2013-186972, and an English translation of the Office Action. (8 pages).
(Continued)

*Primary Examiner* — Kieu Vu
*Assistant Examiner* — Asteway T Gattew
(74) *Attorney, Agent, or Firm* — Buchanan Ingersoll & Rooney PC

(57) ABSTRACT

An image forming apparatus as a displaying device receives a pinch out operation on a touch panel of a portable telecommunication terminal device, when displaying the operation screen on the touch panel of the portable telecommunication terminal device. The image forming apparatus determines whether there is an identified area in the operation screen or not when receiving the pinch out operation. The image forming apparatus enlarges the image around a center of the enlargement in the identified area, in case that there is the identified area in the operation screen. The image forming apparatus enlarges the image around a center of the enlargement as a point moved from a midpoint of the pinch out operation in a direction determined based on displacement of the two contact points, a distance of the movement is determined based on displacement of the two contact
(Continued)

points, in case that there is not the identified area in the operation screen.

18 Claims, 18 Drawing Sheets

(52) U.S. Cl.
CPC ..... *H04N 1/00411* (2013.01); *H04N 1/00469* (2013.01); *G06F 2203/04806* (2013.01); *H04N 2201/0075* (2013.01); *H04N 2201/0094* (2013.01)

(58) Field of Classification Search
CPC .... H04N 2201/0075; H04N 2201/0094; G06F 3/04845; G06F 3/04883; G06F 3/0488; G06F 3/017; G06F 2203/04808; G06F 2203/04806
See application file for complete search history.

(56) References Cited

U.S. PATENT DOCUMENTS

| | | | |
|---|---|---|---|
| 2006/0044283 | A1 | 3/2006 | Eri et al. |
| 2010/0079498 | A1 | 4/2010 | Zaman et al. |
| 2012/0139950 | A1* | 6/2012 | Sogo .................. G06F 3/04845 345/661 |
| 2013/0100497 | A1 | 4/2013 | Amiya et al. |
| 2013/0106731 | A1* | 5/2013 | Yilmaz et al. ........ G06F 3/0346 345/173 |
| 2013/0278530 | A1 | 10/2013 | Hirata |
| 2014/0071171 | A1* | 3/2014 | Mcgowan et al. .. G06F 3/04883 345/661 |
| 2014/0189605 | A1* | 7/2014 | Helfman ............... G06F 3/0488 715/863 |
| 2014/0215365 | A1* | 7/2014 | Hiraga et al. ....... G06F 3/04883 715/765 |

FOREIGN PATENT DOCUMENTS

| | | |
|---|---|---|
| JP | 2003-067135 A | 3/2003 |
| JP | 2006-072489 A | 3/2006 |
| JP | 2011-059952 A | 3/2011 |
| JP | 2012-137837 A | 7/2012 |
| JP | 2013-088729 A | 5/2013 |
| JP | 2013-156958 A | 8/2013 |

OTHER PUBLICATIONS

Office Action and Search Report dated Feb. 6, 2017, by the State Intellectual Property Office of People's Republic of China in corresponding Chinese Patent Application No. 201410450073.0 and an English translation of the Office Action (17 pages).

Second Office Action dated Oct. 24, 2017 by the State Intellectual Property Office of People's Republic of China in corresponding Chinese Patent Application No. 201410450073.0 and an English Translation of the Office Action. (13 pages).

* cited by examiner

FIG.10

| CONTROL NO. | X COORDINATE | Y COORDINATE | SIZE | TYPE | .... |
|---|---|---|---|---|---|
| 0 | 45 | 15 | 50 × 30 | BUTTON | .... |
| 1 | 145 | 15 | 50 × 30 | BUTTON | .... |
| 2 | 105 | 75 | 130 × 30 | CHARACTER INPUTTING AREA | .... |
| 3 | 105 | 105 | 130 × 30 | CHARACTER INPUTTING AREA | .... |
| 4 | 105 | 135 | 130 × 30 | CHARACTER INPUTTING AREA | .... |
| ⋮ | ⋮ | ⋮ | ⋮ | ⋮ | |

DISPLAYING DEVICE WHICH CAN RECEIVE PINCH OUT OPERATION

This application is based on Japanese Patent Application No. 2013-186972 filed with the Japan Patent Office on Sep. 10, 2013, the entire content of which is hereby incorporated by reference.

BACKGROUND OF THE INVENTION

Field of the Invention

This invention relates to a displaying device. More specifically, this invention relates to a displaying device which can receive a pinch out operation.

Description of the Related Art

An image forming apparatus, for example a MFP (Multi Function Peripheral), is usually equipped with an operation panel. The operation panel includes a display unit and a touch panel placed on the display unit. The display unit consists of a LCD (Liquid Crystal Display) or the like. The touch panel consists of a transparent touch pad. A user of the image forming apparatus touches the touch panel of the operation panel with fingers and can perform various operations of the image forming apparatus.

A portable telecommunication terminal device such as a smart phone, a tablet terminal device or the like becomes sophisticated. Then, cooperation between a portable telecommunication terminal device and an image forming apparatus is desired. More specifically, it is desired that (a) a user operates an image forming apparatus via a portable telecommunication terminal device, (b) documents stored in a portable telecommunication terminal device are printed by an image forming apparatus, and (c) documents in a portable telecommunication terminal device are moved to an image forming apparatus to store it in the image forming apparatus, and a plurality of users share the documents. Further, it is desired that (d) a user uses data such as an address book stored in a portable telecommunication terminal device, so that an image forming apparatus transmits images read by the image forming apparatus to an addressee designated from among addressees in the address book of the portable telecommunication terminal device, and (e) a user stores images read by an image forming apparatus in a portable telecommunication terminal device.

Some operation panels of image forming apparatuses and some portable telecommunication terminal devices can be operated by a multi touch operation. A multi touch operation is an operation in which an operation portion contacts at a plurality of points, and includes a pinch in operation and a pinch out operation, for example. According to such kind of portable telecommunication terminal devices, more direct and instinctive operations can be provided.

There are following techniques for a multi touch operation, for example. (a) An image being displayed on a touch panel is reduced, when two fingers are touching the touch panel and an operation which moves the two fingers closer to each other (a pinch in operation) is detected. (b) An image being displayed on a touch panel is enlarged, when two fingers are touching the touch panel and an operation which moves the two fingers away from each other (a pinch out operation) is detected. Document 1 below discloses the technique of enlarging an image around the center of the enlargement as the point moved from the midpoint of the two starting points of the pinch out operation in the direction determined based on displacement of the contact points of the pinch out operation, the distance of the movement is determined based on displacement of the contact points of the pinch out operation.

Documents 2 and 3 below disclose techniques of enlarging images being displayed on a display screen of a touch panel. An information processing apparatus of Document 2 below displays two button groups. The property which can be operated is assigned to one of the two button groups. The property for displaying status is assigned to another of the two button groups. The information processing apparatus makes the properties exchanged between the two button groups, when an arbitrary position in a displaying area corresponding to the button group to which the status display property is assigned is touched.

A touch input processing device disclosed in Document 3 below sets an enlarge operation area on a part of a display screen. In case that a touching point is in the enlarge operation area and the touching point is dragged, the touch input processing device switches a normal operation mode to an enlarge operation mode. The normal operation mode is a mode in which the real touching point is recognized as the touching position on the touch panel. The enlarge operation mode is a mode in which the coordinates of the touching point is converted, so that the real touching input in the enlarge operation area is recognized as a virtual touch input in all of the area of the touch panel.

Document 1: U.S. Pat. No. 7,844,915
Document 2: Japan Patent Publication No. 2006-72489
Document 3: Japan Patent Publication No. 2012-137837

According to the technique of Document 1, a user changes behavior of fingers which are performing a pinch out operation, so that the center of the enlargement (the target of the enlargement) can be moved from the midpoint of the pinch out operation to the desired location. However, the technique of Document 1 has a problem that the user can not perform a proper displaying with enlargement. The two fingers performing a pinch out operation do not move in straight line sometimes. The amounts of movement of two fingers differ from each other. For example, a user may perform a pinch out operation to make the midpoint of the pinch out operation as the center of the enlargement (perform an enlargement displaying in which the center of the enlargement is kept at the position of the midpoint of the pinch out operation). However, in reality, the center of the enlargement sometimes deflects from the desired point of the user. In case that the midpoint of the pinch out operation deflects from the location where the user desired as the center of the enlargement, a location not desired by the user may be the center of the enlargement. In consequence, the location the user desired as the center of the enlargement may move outside of the displaying area after the enlargement. In this situation, the user can not perform the operation continuously.

The problem in which users can not perform a proper display with enlargement arises in all kinds of displaying devices. The problem is especially significant for a portable telecommunication terminal device which works together with an image forming apparatus. In case that a portable telecommunication terminal device works together with an image forming apparatus, keys corresponding to software keys and hardware keys in the operation panel of the image forming apparatus are displayed on the touch panel of the portable telecommunication terminal device. Herewith, the user of the portable telecommunication terminal device operates the image forming apparatus via the portable telecommunication terminal device, having an operational feeling same as that of the operation via an operation panel of the image forming apparatus. However, the area of the touch panel of the portable telecommunication terminal device is far smaller than the same of the touch panel of the operation panel. Hence, keys being displayed on the touch panel of the portable telecommunication terminal device tend to be small. When a user operates the image forming apparatus via the portable telecommunication terminal device, the user sometimes enlarges the keys and the character inputting areas temporarily, to ensure the operability and the readability of the characters on the display of the portable telecommunication terminal device.

SUMMARY OF THE INVENTION

The object of this invention is for providing a displaying device which can display enlarged images properly.

A displaying device according to an embodiment of this invention comprises: an image display unit for displaying an image on a displaying screen; and a processor; wherein the processor is configured to: receive a pinch out operation in which two contact points contact with the displaying screen and the two contact points move away from each other, when the image display unit displays the image; determine whether there is an identified area in the image or not, in case that the pinch out operation is received; enlarge the image around a center of the enlargement in the identified area, in case that there is the identified area in the image; and enlarge the image around a center of the enlargement as a point moved from a midpoint of the pinch out operation in a direction determined based on displacement of the two contact points, a distance of the movement is determined based on displacement of the two contact points, in case that there is not the identified area in the image.

A method of controlling a displaying device having an image display unit for displaying an image on a displaying screen, according to another embodiment of this invention, comprises the processes to: receive a pinch out operation in which two contact points contact with the displaying screen and the two contact points move away from each other, when the image display unit displays the image; determine whether there is an identified area in the image or not, in case that the pinch out operation is received; enlarge the image around a center of the enlargement in the identified area, in case that there is the identified area in the image; and enlarge the image around a center of the enlargement as a point moved from a midpoint of the pinch out operation in a direction determined based on displacement of the two contact points, a distance of the movement is determined based on displacement of the two contact points, in case that there is not the identified area in the image.

A non-transitory computer-readable recording medium encoded with a control program for a displaying device having an image display unit for displaying an image on a displaying screen, according to another embodiment of this invention, the control program causing a computer to execute the processes to: receive a pinch out operation in which two contact points contact with the displaying screen and the two contact points move away from each other, when the image display unit displays the image; determine whether there is an identified area in the image or not, in case that the pinch out operation is received; enlarge the image around a center of the enlargement in the identified area, in case that there is the identified area in the image; and enlarge the image around a center of the enlargement as a point moved from a midpoint of the pinch out operation in a direction determined based on displacement of the two contact points, a distance of the movement is determined based on displacement of the two contact points, in case that there is not the identified area in the image.

A displaying system including a display device and a display terminal device which can communicate with the display device, according to another embodiment of this invention comprises: an image display unit for displaying an image on a displaying screen of the display terminal device; and a processor; wherein the processor is configured to: receive a pinch out operation in which two contact points contact with the displaying screen and the two contact points move away from each other via the display terminal device, when the image display unit displays the image; determine whether there is an identified area in the image or not, in case that the pinch out operation is received; enlarge the image on the displaying screen, around a center of the enlargement in the identified area, in case that there is the identified area in the image; and enlarge the image on the displaying screen, around a center of the enlargement as a point moved from a midpoint of the pinch out operation in a direction determined based on displacement of the two contact points, a distance of the movement is determined based on displacement of the two contact points, in case that there is not the identified area in the image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 schematically shows a coordinates table.

DESCRIPTION OF THE PREFERRED EMBODIMENTS

The embodiments of this invention will be explained below based on the figures.

In this description, a pinch out operation means a operation in which two contact points contact with a display screen, and the two contact points move away from each other. A midpoint of a pinch out operation means a midpoint between two contact points of a pinch out operation, and the midpoint is on the straight line connects the two contact points. Controls mean components of a graphical user interface (GUI), and include a key (a button), a character inputting area, a scroll bar, a list, a menu, a toolbar, a combo box, an icon, or the like. The target of the enlargement (the center of the enlargement) means the point of the center of the enlargement, when enlarging and displaying the image.

[A Structure of an Image Forming System]

Firstly, a structure of an image forming system of this embodiment will be explained.

Figure 1:
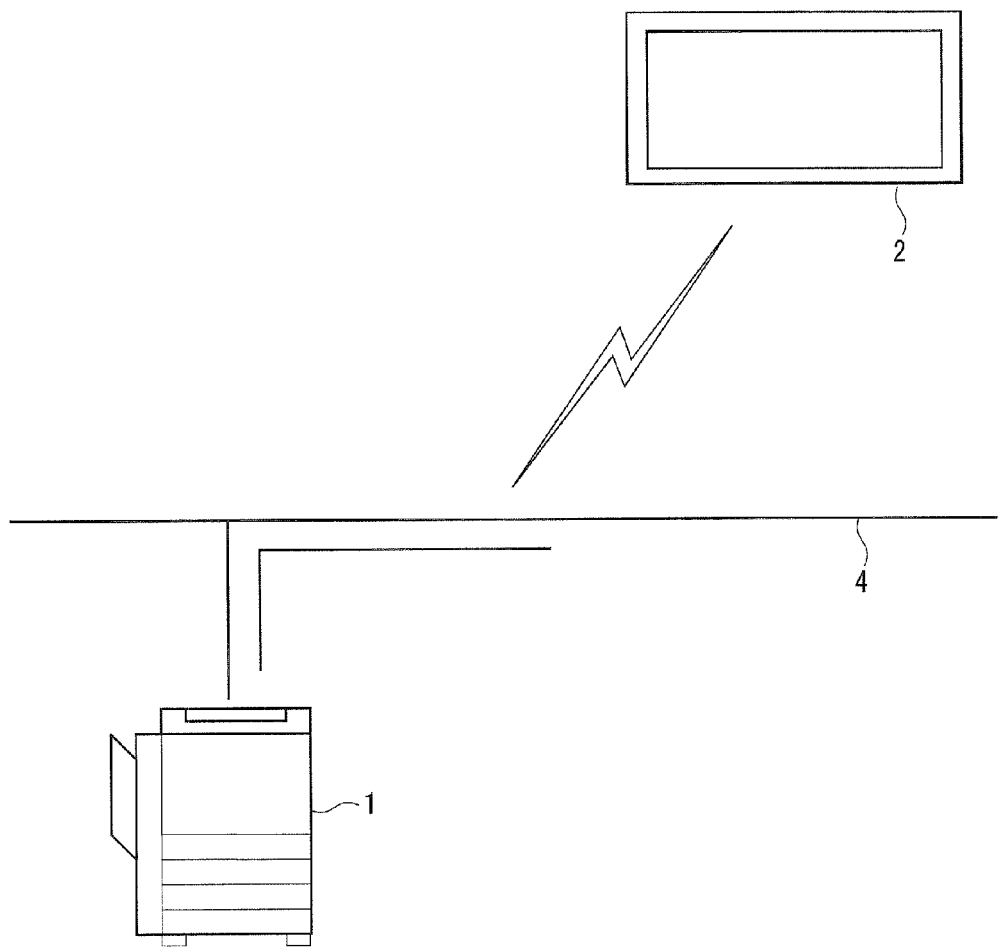
FIG. 1 shows a conceptual diagram of an image forming system of an embodiment of this invention.

Referring to FIG. 1, an image forming system has an image forming apparatus 1 (an example of a displaying device) and a portable telecommunication terminal device 2 (an example of displaying terminal device). The image forming apparatus 1 is a MFP having a scanner function, a facsimile function, a copying function, a function as a printer, a data transmitting function, and a server function, for example. Image forming apparatus 1 is connected with external devices (not shown in the Figure) and portable telecommunication terminal device 2, via a network 4.

Network 4 uses a private line such as a wired or wireless LAN (Local Area Network), for example. Network 4 connects various devices by a TCP/IP (Transmission Control Protocol/Internet Protocol). Devices connected to network 4 can exchange various data with each other. Network 4 may use a public line or wireless communication.

Image forming apparatus 1 forms copied images of generated images on sheets based on scanned document images and print data received from external devices or portable telecommunication terminal device 2, for example. Print data is the data wherein drawing instructions are converted by a printer driver to a page description language which image forming apparatus 1 can process, for example. The drawing instructions are issued by an operating system or an application program of external devices or portable telecommunication terminal device 2. Print data may be the document data described by the file format of PDF, TIFF, JPEG, XPS, or the like.

Image forming apparatus 1 can transmit document images to external devices or portable telecommunication terminal device 2, via network 4. Further, image forming apparatus 1 can store document data received from external devices or portable telecommunication terminal device 2 in a fixed storage device of image forming apparatus 1.

Portable telecommunication terminal device 2 can transmit and receive data with image forming apparatus 1 by wireless or wire communication (preferably, wireless communication). Portable telecommunication terminal device 2 is a portable computer device which has a CPU (Central Processing Unit), a RAM (Random Access Memory), a fixed storage device, a monitor, a LCD panel which can be operated by touch operations, or the like. Portable telecommunication terminal device 2 may be a cellular phone, a smartphone, a tablet PC (Personal Computer), or the like.

The image forming system may have structures differ from FIG. 1. The image forming apparatus forms images by an electrophotographic technology, an electrostatic recording method, or the like. The image forming apparatus may be a facsimile device, a copying machine, a printer, or the like, other than a MFP. An image forming system may not include portable telecommunication terminal device 2. Image forming apparatus 1 may not communicate with portable telecommunication terminal device 2.

Figure 2:
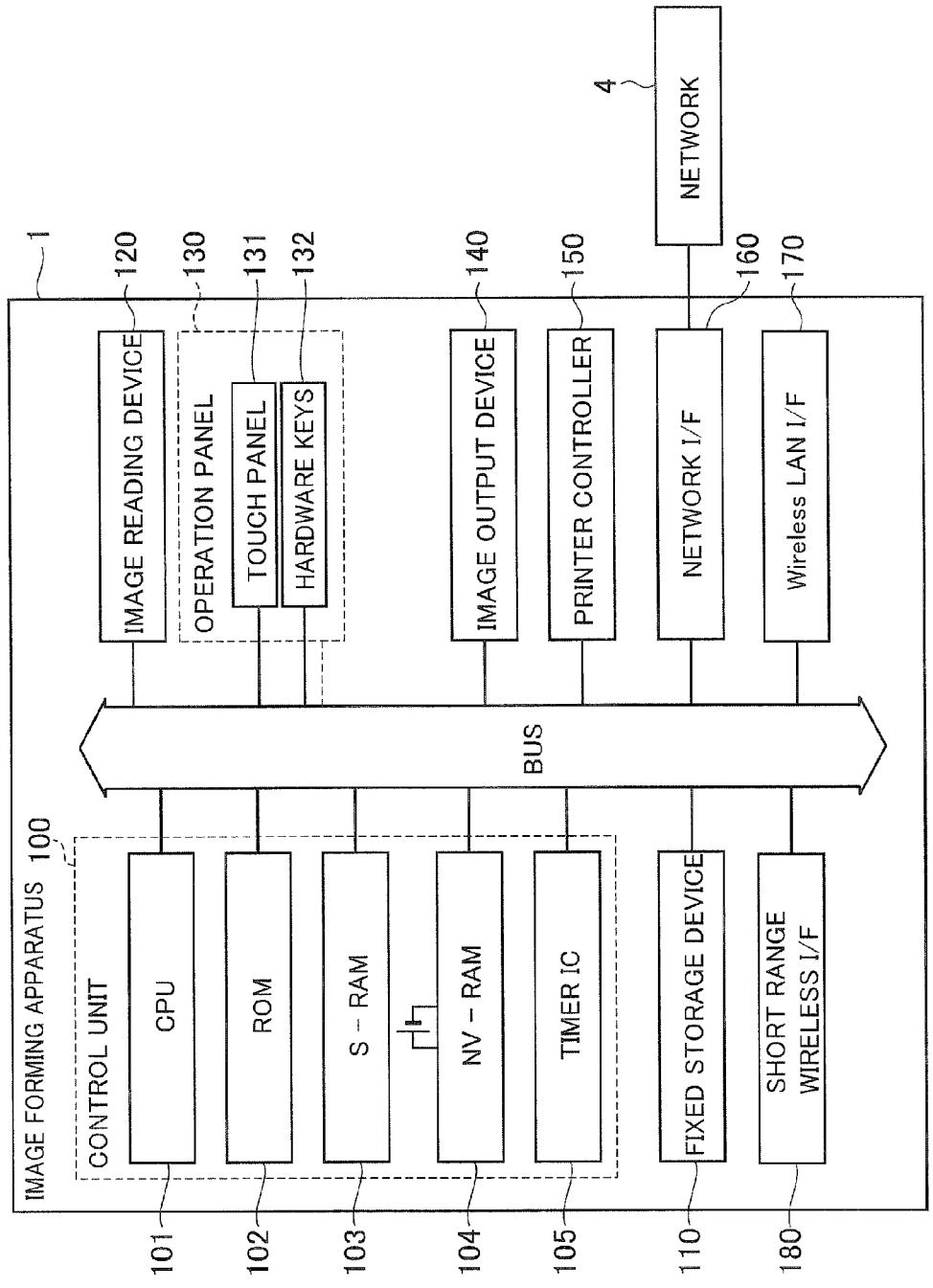
FIG. 2 shows a block diagram of the inner structure of the image forming apparatus 1.

FIG. 2 shows a block diagram of the inner structure of image forming apparatus 1.

Referring to FIG. 2, image forming apparatus 1 includes a CPU 101, a ROM (Read Only Memory) 102, a SRAM (Static Random Access Memory) 103, a NVRAM (Non Volatile Random Access Memory) 104, a timer IC (Integrated Circuit) 105, a fixed storage device 110, an image reading device 120, an operation panel 130, an image output device 140, a printer controller 150, a network I/F 160, a wireless LAN I/F 170, and a short range wireless I/F 180.

CPU 101 is connected with each of ROM 102, SRAM 103, NVRAM 104, and timer IC 105, via a bus. Control unit 100 consists of CPU 101, ROM 102, SRAM 103, NVRAM 104, and timer IC 105. CPU 101 panoptically controls behavior of each part of image forming apparatus 1. When communicating with portable telecommunication terminal device 2, CPU 101 controls displayed images on touch panel 220 (see FIG. 3) of portable telecommunication terminal device 2. ROM 102 contains control programs for controlling behavior of image forming apparatus 1. SRAM 103 is a working memory for CPU 101. NVRAM 104 is backed up by a battery. NVRAM 104 stores various kinds of settings for the image forming. Timer IC 105 measures various kind of time.

Control unit 100 is connected with each of fixed storage device 110, image reading device 120, operation panel 130, image output device 140, printer controller 150, network I/F 160, and wireless LAN I/F 170, via a bus.

Fixed storage device 110 is a hard disk device, for example. Fixed storage device 110 stores image data of operation screens displayed on operation panel 130 and portable telecommunication terminal device 2. Image reading device 120 reads document images. Operation panel 130 includes touch panel 131, hardware keys 132, or the like. Touch panel 131 consists of a display unit for displaying diverse information of operation screens, and a touch pad which detects a touch on the display unit. Hardware keys 132 includes a numerical keypad for inputting numerals, a printing key for receiving an instruction of execution of printing, a log out key for receiving a log out instruction by a user, or the like. Image output device 140 forms copied images on sheets. Printer controller 150 forms copied images based on print data received via network I/F 160. Network I/F 160 connects image forming apparatus 1 and network 4. Network I/F 160 transmits and receives various kinds of information with external devices and portable telecommunication terminal device 2. Wireless LAN I/F 170 executes wireless communication with external devices and portable telecommunication terminal device 2. Short range wireless I/F 180 is a device being conformance with Bluetooth (a registered trademark), IrDA (a registered trademark), or the like. Short range wireless I/F 180 is mainly used for communication with portable telecommunication terminal device 2.

Figure 3:
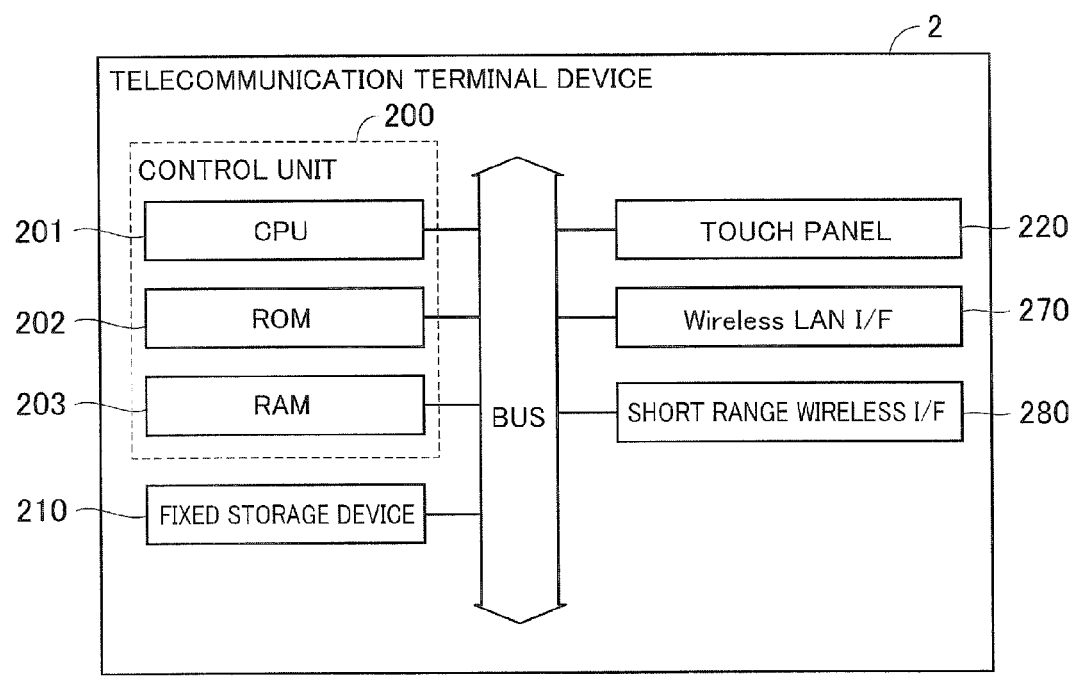
FIG. 3 shows a block diagram of the inner structure of portable telecommunication terminal device 2.

FIG. 3 shows a block diagram of the inner structure of portable telecommunication terminal device 2.

Referring to FIG. 3, portable telecommunication terminal device 2 includes a CPU 201, a ROM 202, a RAM 203, a fixed storage device 210, a touch panel 220 (an example of a displaying screen), a wireless LAN I/F 270, and a short range wireless I/F 280. CPU 201 is connected with ROM 202 and RAM 203 via a bus. Control unit 200 consists of CPU 201, ROM 202, and RAM 203. CPU 201 panoptically controls behavior of each part of portable telecommunication terminal device 2. ROM 202 stores a control program for controlling behavior of portable telecommunication terminal device 2. RAM 203 is a working memory for CPU 201.

Control unit 200 is connected with fixed storage device 210, touch panel 220, wireless LAN I/F 270, and short range wireless I/F 280 via a bus. Fixed storage device 210 is a hard disk device, for example. Fixed storage device 210 stores diverse information. Touch panel 220 consists of a display unit for displaying diverse information of operation screens etc. and a touch pad which detects a touch on the display unit. Wireless LAN I/F 270 executes wireless communication with image forming apparatus 1 etc. Short range wireless I/F 280 is a device being conformance with Bluetooth (a registered trademark), IrDA (a registered trademark), or the like. Short range wireless I/F 280 is mainly used for communication with image forming apparatus 1.

A user can operate image forming apparatus 1 via portable telecommunication terminal device 2. Portable telecommunication terminal device 2 is connected with image forming apparatus 1 by wireless and ready for communicating with image forming apparatus 1, when portable telecommunication terminal device 2 is in the area where portable telecommunication terminal device 2 can communicate with image forming apparatus 1 by wireless using short range wireless I/F 180 and 280. When portable telecommunication terminal device 2 is ready for communicating with image forming apparatus 1 and receives pressing of an icon for starting cooperation with image forming apparatus 1 on touch panel 220 etc., portable telecommunication terminal device 2 starts communication with image forming apparatus 1. When image forming apparatus 1 starts communication with portable telecommunication terminal device 2, image forming apparatus 1 transmits an operation screen (an initial screen) of image forming apparatus 1 to portable telecommunication terminal device 2. Portable telecommunication terminal device 2 displays the received operation screen on touch panel 220, and receives touches (inputs) from the user. Portable telecommunication terminal device 2 transmits received touch information to image forming apparatus 1. Image forming apparatus 1 executes processing based on information received. Image forming apparatus 1 transmits a new operation screen (an updated operation screen) to portable telecommunication terminal device 2 based on the touch received, in case that an update of the operation screen is needed. Portable telecommunication terminal device 2 displays an operation screen of an image forming apparatus 1 on touch panel 220 under control of image forming apparatus. Image forming apparatus 1 and portable telecommunication terminal device 2 can communicate with each other using wireless LAN I/F 170 and 270 via an access point, instead of communicating via short range wireless I/F 180 and 280.

All the operation screens may be stored previously by portable telecommunication terminal device 2. In this case, image forming apparatus 1 may not transmit operation screens to portable telecommunication terminal device 2 each time receiving a touch. Hence, the volume of communication between image forming apparatus 1 and portable telecommunication terminal device 2 can be reduced.

[An Overview of Behavior of an Image Forming Apparatus]

Next, an overview of behavior of an image forming apparatus when receiving a pinch out operation on touch panel 220 of portable telecommunication terminal device 2 will be explained.

Figure 4:
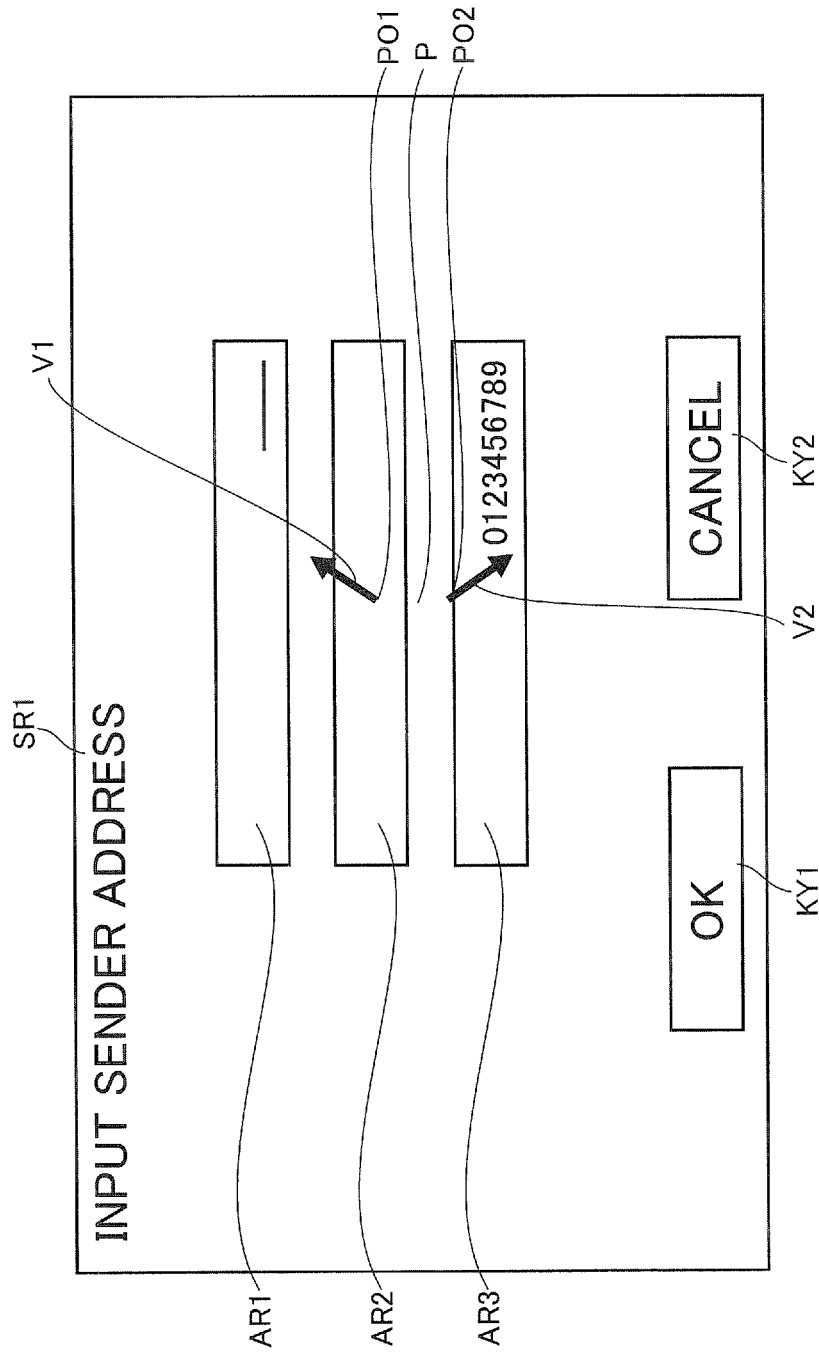
FIG. 4 schematically shows an operation screen SR1 being displayed on touch panel 220 of portable telecommunication terminal device 2.

FIG. 4 schematically shows operation screen SR1 being displayed on touch panel 220 of portable telecommunication terminal device 2.

Referring to FIG. 4, operation screen SR1 (an example of a displayed image on a displaying screen) is for receiving input of delivery addresses of files, when image forming apparatus 1 transmits the files. Operation screen SR1 includes areas AR1, AR2 and AR3, and keys (buttons) KY1 and KY2. Areas AR1, AR2 and AR3 (character inputting areas) are for inputting characters (including numerals, alphabets, symbols, or the like), and receiving forwarding addresses. Namely, a user can input a maximum of three addresses via operation screen SR1. Key KY1 is for fixing addresses input. Key KY2 is for cancelling displaying the operation screen which receives input of delivery addresses of files.

When image forming apparatus 1 displays operation screen SR1 on touch panel 220 and receives a pinch out operation on touch panel 220, image forming apparatus 1 enlarges the image around the center of the enlargement determined based on the pinch out operation on operation screen SR1.

In the following explanations, if not otherwise specified, it is assumed that a pinch out operation indicated by vectors V1 and V2 (see FIG. 4) is performed. It is assumed that the midpoint P (see FIG. 4) of the pinch out operation is between area AR2 and area AR3. Two contact points PO1 and PO2 of the pinch out operation contact with touch panel 220. Vectors V1 and V2 correspond to displacement of the contact points of the pinch out operation.

Figure 5:
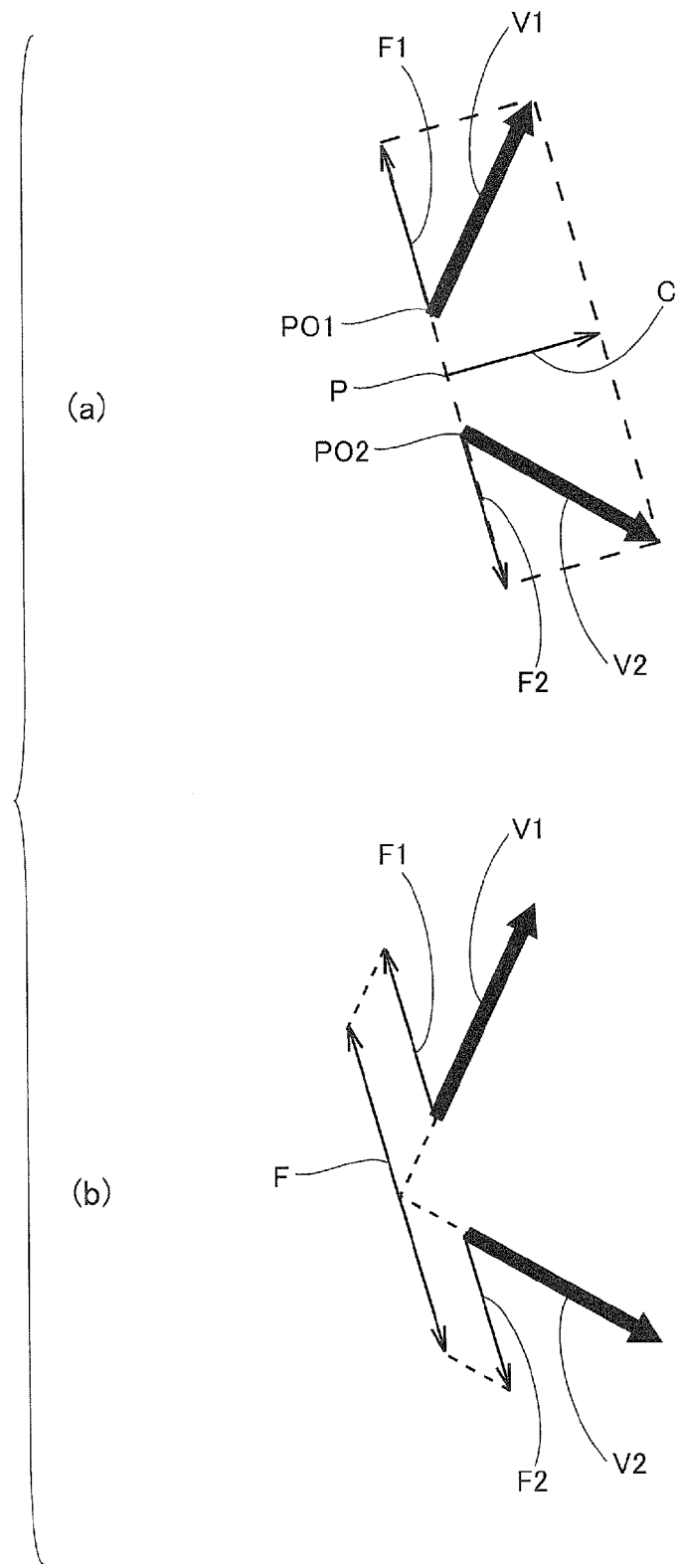
FIG. 5 shows the relationship between a pinch out operation and an enlarge display.

FIG. 5 shows the relationship between a pinch out operation and an enlarge display.

Referring to FIG. 5, when receiving pinch out operation, image forming apparatus 1 determines whether there is an identified area in operation screen SR1 or not (The identified area will be explained in the next section).

In case that there is the identified area in operation screen SR1, image forming apparatus 1 enlarges the image around the center of the enlargement as the location of the identified area (this enlarged display method may be hereinafter referred to as the first enlarged display method).

On the other hand, in case that there is not the identified area in operation screen SR1, image forming apparatus 1 enlarges the image around the center of the enlargement as the point moved from the midpoint P of the pinch out operation in the direction determined based on displacement of the contact points of the pinch out operation, the distance of the movement is determined based on displacement of the contact points of the pinch out operation (this enlarged display method may be hereinafter referred to as the second enlarged display method).

More specifically, as indicated in FIG. 5 (*a*), image forming apparatus 1 resolves vectors V1 and V2 into vector C as a component of the movement, and vectors F1 and F2 as components of the enlargement of the pinch out operation. Then, image forming apparatus 1 sets the center of the enlargement in the opposite direction (in the direction from top right to bottom left in FIG. 5) of vector C of a component of the movement, the distance between the midpoint P and the center corresponds to the magnitude of vector C (in other words, the distance and the direction are for a flick operation expressed by reversed vector C of a component of movement).

Image forming apparatus 1 determines the enlargement factor in both of the first and the second enlarged display method (regardless of the presence of the identified area) in the following manner. As shown in FIG. 5 (*b*), image forming apparatus 1 combines vectors F1 and F2 as components of the enlargement, by moving vectors F1 and F2 parallel. Herewith, image forming apparatus 1 acquires vector F. Image forming apparatus 1 enlarges the image around the center of the enlargement at the enlargement factor corresponding to the magnitude of vector F.

In case that the identified area is the center of the enlargement, and a part of the identified area is to move outside of the displaying screen when enlarging at the enlargement factor based on the pinch out operation, image forming apparatus 1 may move the center of the enlargement and/or alter the enlargement factor to be able to display all of the identified area on the displaying screen. Herewith, a user can properly enlarge the desired area, even if the user performs a false pinch out operation.

Further, image forming apparatus 1 may execute the second enlarged display, in case that the time elapsed from the beginning of the pinch out operation is more than or equal to a predetermined time, regardless of the presence of the identified area. When a pinch out operation takes a long time, it is assumed that the user is performing the pinch out operation with checking the center of the enlargement. In this case, image forming apparatus 1 presumes that the user is coordinating the displaying area intentionally. Namely, image forming apparatus 1 changes the enlarged display method to the second enlarged display method, in case that image forming apparatus 1 is displaying the image using the first enlarged display method. Herewith, image forming apparatus 1 improves convenience of users.

[The Selecting Method of the Identified Area]

Next, the selecting method of the identified area will be explained.

Image forming apparatus 1 selects the identified area among from controls in operation screen SR1, using one of the first to the fourth selecting methods below. When the identified area is selected, image forming apparatus 1 enlarges the image around the center of the enlargement as the identified area by the first enlarged display method. When the identified area is not selected, image forming apparatus 1 enlarges the image by the second enlarged display method.

Image forming apparatus 1 preferably selects at least one of the software key which users can operate and the area in which users can input characters, among from controls in operation screen SR1 as the identified area.

The first to the fourth selecting methods will be explained below in order.

FIGS. 6 to 9 schematically show displays enlarged with the selected center of the enlargement, adopting each one of the first to the forth selecting methods.

Figure 6:
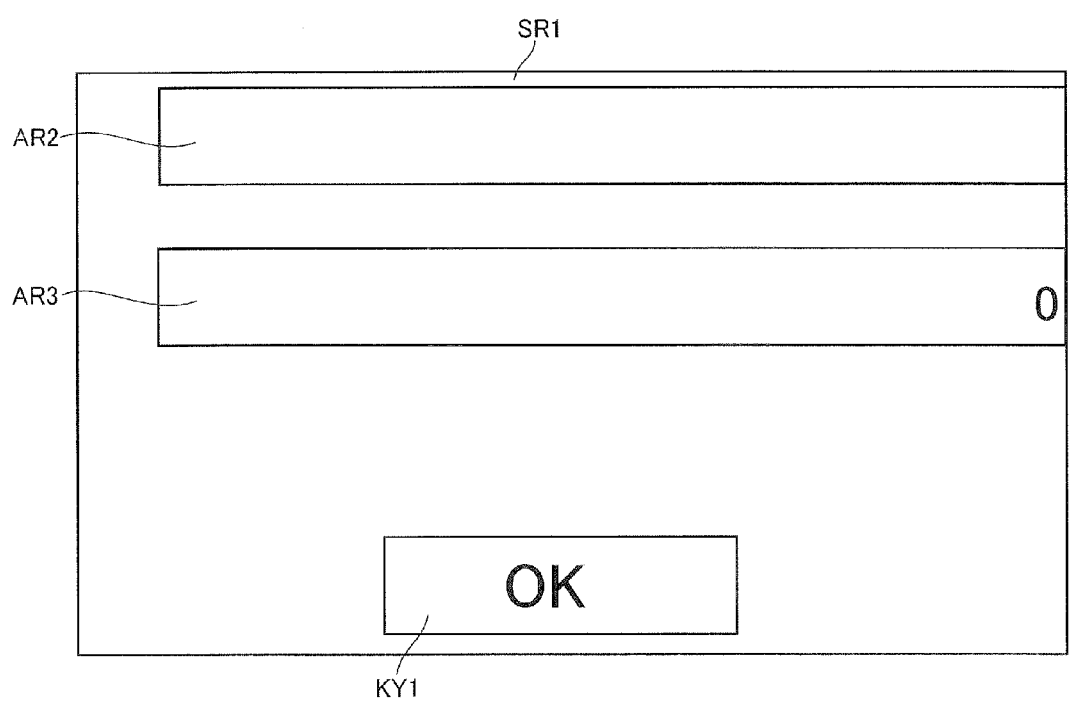
FIGS. 6 to 9 schematically show displays enlarged with the selected center of the enlargement, adopting each one of the first to the forth selecting methods.

Referring to FIG. 4, in case that the first selecting method is adopted, image forming apparatus 1 selects the area previously (last time) selected as the identified area. More specifically, image forming apparatus 1 stores the identified area selected in fixed storage device 110 etc. each time the identified area is selected. When image forming apparatus 1 receives a new pinch out operation, image forming apparatus 1 reads the immediately preceding identified area selected previously from fixed storage device 110 etc. In case that the immediately preceding identified area selected previously is key KY1, image forming apparatus 1 acquires the distance d between key KY1 and the midpoint P of the pinch out operation. If the acquired distance d is less than prescribed value D, image forming apparatus 1 selects key KY1 as the identified area in accordance with the first selecting method. In consequence, as shown in FIG. 6, image forming apparatus 1 enlarges the image around the center of the enlargement as an arbitrary point in key KY1 (for example, the median point of key KY1) at the enlargement factor based on the pinch out operation. On the other hand, if the acquired distance d is more than or equal to prescribed value D, image forming apparatus 1 does not select the area previously selected as the identified area.

Distance d may be a distance between an arbitrary point in a control which a candidate for the identified area and the midpoint P of the pinch out operation. Distance d may be a distance between the median point in a control which is a candidate for the identified area and the midpoint P of the pinch out operation, for example. Distance d may be a distance between the outline of a control which is the nearest from the midpoint P and the midpoint P of the pinch out operation, the control is a candidate for the identified area.

Image forming apparatus 1 may select the area selected last time as the identified area when a prescribed time does not elapse after completion of the previous pinch out operation. Also, image forming apparatus 1 may not select the area selected last time as the identified area, when a prescribed time have elapsed after completion of the previous pinch out operation.

Prescribed value D can be set as an arbitrary value. Prescribed value D may be set as half of the distance between contact points PO1 and PO2 of the pinch out operation. Herewith, a control between starting contact points PO1 and PO2 of the pinch out operation is selected as the identified area. A user can set the center of the enlargement as the desired point by the instinctive pinch out operation.

Figure 7:
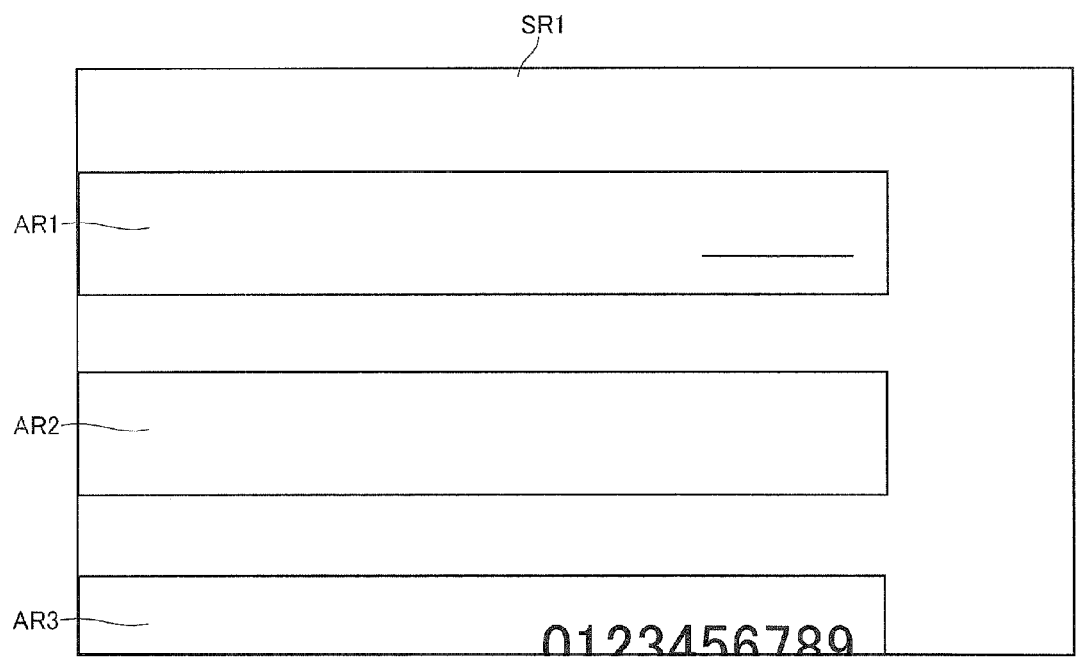

Referring to FIG. 4, when adopting the second selecting method, image forming apparatus 1 selects an active area as the identified area. More specifically, it is assumed that a user selected area AR1 before image forming apparatus 1 receives a pinch out operation (In this situation, a cursor is blinking at area AR1). In this case, image forming apparatus 1 acquires distance d between area AR1 and the midpoint P of the pinch out operation. If the acquired distance d is less than prescribed value D, image forming apparatus 1 selects area AR1 as the identified area in accordance with the second selecting method. In consequence, as shown in FIG. 7, image forming apparatus 1 enlarges the image around the center of the enlargement as an arbitrary point in area AR1 (for example, the median point of area AR1) at an enlargement factor based on the pinch out operation. On the other hand, if the acquired distance d is more than or equal to prescribed value D, image forming apparatus 1 does not select the active area as the identified area.

Figure 8:
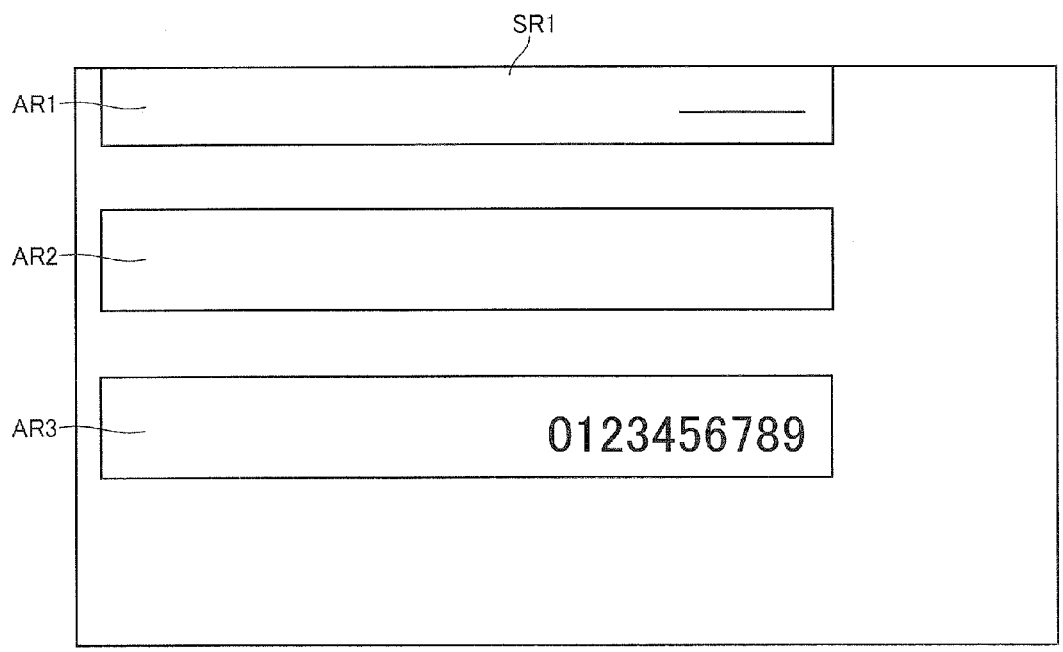

Referring to FIG. 4, when adopting the third selecting method, image forming apparatus 1 selects the area in which characters are entered as the identified area. More specifically, it is assumed that a user input characters "0123456789" in area AR3 before image forming apparatus 1 receives a pinch out operation (In this case, characters "0123456789" are displayed in area AR3). In such a case, image forming apparatus 1 acquires distance d between area AR3 and the midpoint P of the pinch out operation. When acquired distance d is less than prescribed value D, image forming apparatus 1 selects area AR3 as the identified area in accordance with the third selecting method. In consequence, as shown in FIG. 8, image forming apparatus 1 enlarges the image around the center of the enlargement as an arbitrary point in area AR3 (for example, the median point of area AR3) at an enlargement factor based on the pinch out operation. On the other hand, when acquired distance d is more than or equal to prescribed value D, image forming apparatus 1 does not select the area in which characters are entered as the identified area.

Image forming apparatus 1 may select the area in which characters are entered as the identified area, when a prescribed time does not elapse after completion of the inputting characters. Also, image forming apparatus 1 may not select the area in which characters are entered as the identified area, when a prescribed time has elapsed after completion of the inputting characters.

Figure 9:
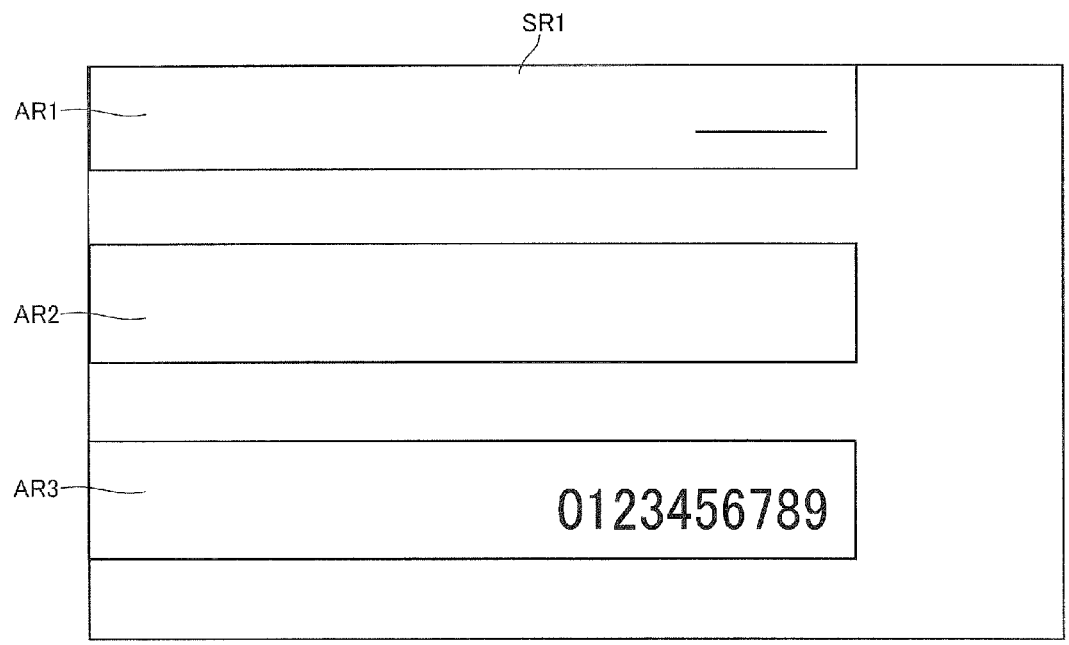

Referring to FIG. 4, when adopting the fourth selecting method, image forming apparatus 1 selects a control wherein the distance d between the control and the midpoint P of the pinch out operation is the shortest, as the identified area. More specifically, it is assumed that image forming apparatus 1 receives a pinch out operation as shown in FIG. 4. In this case, image forming apparatus 1 compares distances d's between each of controls in operation screen SR1 and the midpoint P of the pinch out operation and indicates the control nearest from the midpoint P. In this case, a control wherein the distance d between the control and the midpoint P of the pinch out operation is the shortest is area AR2 (see FIG. 4). Next, image forming apparatus 1 acquires distance d between area AR2 and the midpoint P of the pinch out operation. If acquired distance d is less than prescribed value D, area AR2 is selected as the identified area. In consequence, as shown in FIG. 9, image forming apparatus 1 enlarge the image around the center of the enlargement as an arbitrary point in area AR2 (for example, the median point of area AR2) at an enlargement factor based on the pinch out operation. On the other hand, if acquired distance d is equal to or longer than prescribed value D, image forming apparatus 1 does not select the control wherein the distance between the control and the midpoint P of the pinch out operation is the shortest, as the identified area.

In the specific examples of the first to the fourth selecting methods above, the conditions for selecting an identified area includes a condition that distance d between a control which is a candidate for the identified area and the midpoint P of the pinch out operation is less than prescribed value D. However, this condition may be omitted.

FIG. 10 schematically shows a coordinates table.

Referring to FIG. 10, the coordinates table records the coordinates of displaying position (here, the X-coordinate of the median point of the control (the coordinate in a longitudinal direction in the operation screen), and the Y-coordinate (the coordinate in a horizontal direction in the operation screen)), a displaying size, a type of the control (for example, an area in which a user can enter information by keys, or in which a user can input characters etc.), or the like, for each of controls in the operation screen. Image forming apparatus 1 stores different coordinates tables in fixed storage device 110 etc. for each one of operation screens. Information of each of areas AR1, AR2 and AR3, and keys KY1 and KY2 is stored in the coordinates table of operation screen SR1. A piece of information numbered as a control number of "0" is a piece of information of key KY1. A piece of information numbered as a control number of "1" is a piece of information of key KY2. A piece of information numbered as a control number of "2" is a piece of information of area AR1. A piece of information numbered as a control number of "3" is a piece of information of area AR2. A piece of information numbered as a control number of "4" is a piece of information of area AR3.

Image forming apparatus 1 acquires distances between each of controls in operation screen SR1 and the midpoint P of the pinch out operation, using the coordinates table as shown in FIG. 10. When image forming apparatus 1 selects the identified area by the fourth selecting method, image forming apparatus 1 acquires distances between each of controls and the midpoint P of the pinch out operation, in the order of the control number from "0". Then, image forming apparatus 1 selects the control wherein the distance d between the control and the midpoint P of the pinch out operation is the shortest, as the identified area.

According to the embodiment, one of the first to the fourth selecting methods is adopted in the following priority order, to select the identified area. The priority order of the selecting methods is arbitrary.

1: When a prescribed time does not elapse after completion of the previous pinch out operation, and distance d between the immediately preceding selected area and the midpoint P of the pinch out operation is less then prescribed value D, the immediately preceding selected area is selected as the identified area (the first selecting method).

2: When there is an active area, and distance d between the active area and the midpoint P of the pinch out operation is less then prescribed value D, the active area is selected as the identified area (the second selecting method).

3: When a prescribed time does not elapse after completion of the inputting characters, and distance d between the area in which characters are entered and the midpoint P of the pinch out operation is less then prescribed value D, the area in which characters are entered is selected as the identified area (the third selecting method).

4: When distance d between the control nearest from the midpoint P of the pinch out operation and the midpoint P of the pinch out operation is less then prescribed value D, the control nearest from the midpoint P is selected as the identified area (the fourth selecting method).

[Flowcharts of Behavior of Image Forming Apparatus 1]

Next, flowcharts of behavior of image forming apparatus 1 will be explained.

Figure 11:
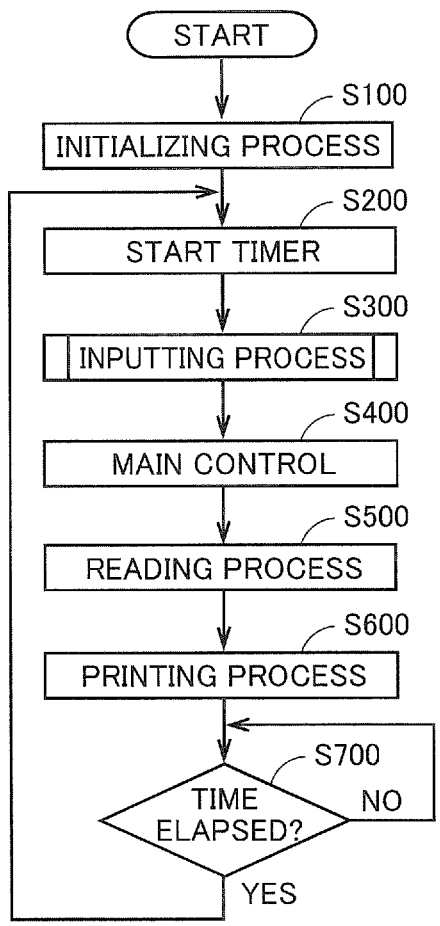
FIG. 11 shows a flowchart of behavior of image forming apparatus 1 of the embodiment of this invention.

FIG. 11 shows a flowchart of behavior of image forming apparatus 1 of the embodiment of this invention.

Referring to FIG. 11, CPU 101 of image forming apparatus 1 executes an initializing process when the power to image forming apparatus 1 turns ON (S100), and starts a main timer (S200). Next, CPU 101 executes the inputting process (S300) and a main control process (S400). CPU 101 executes a reading process (S500) and a printing process (S600). Then, CPU 101 determines whether a prescribed time of the main timer has elapsed or not (S700). When the predetermined time has elapsed (YES at S700), CPU 101 executes the process of step S200 again.

Figure 12:
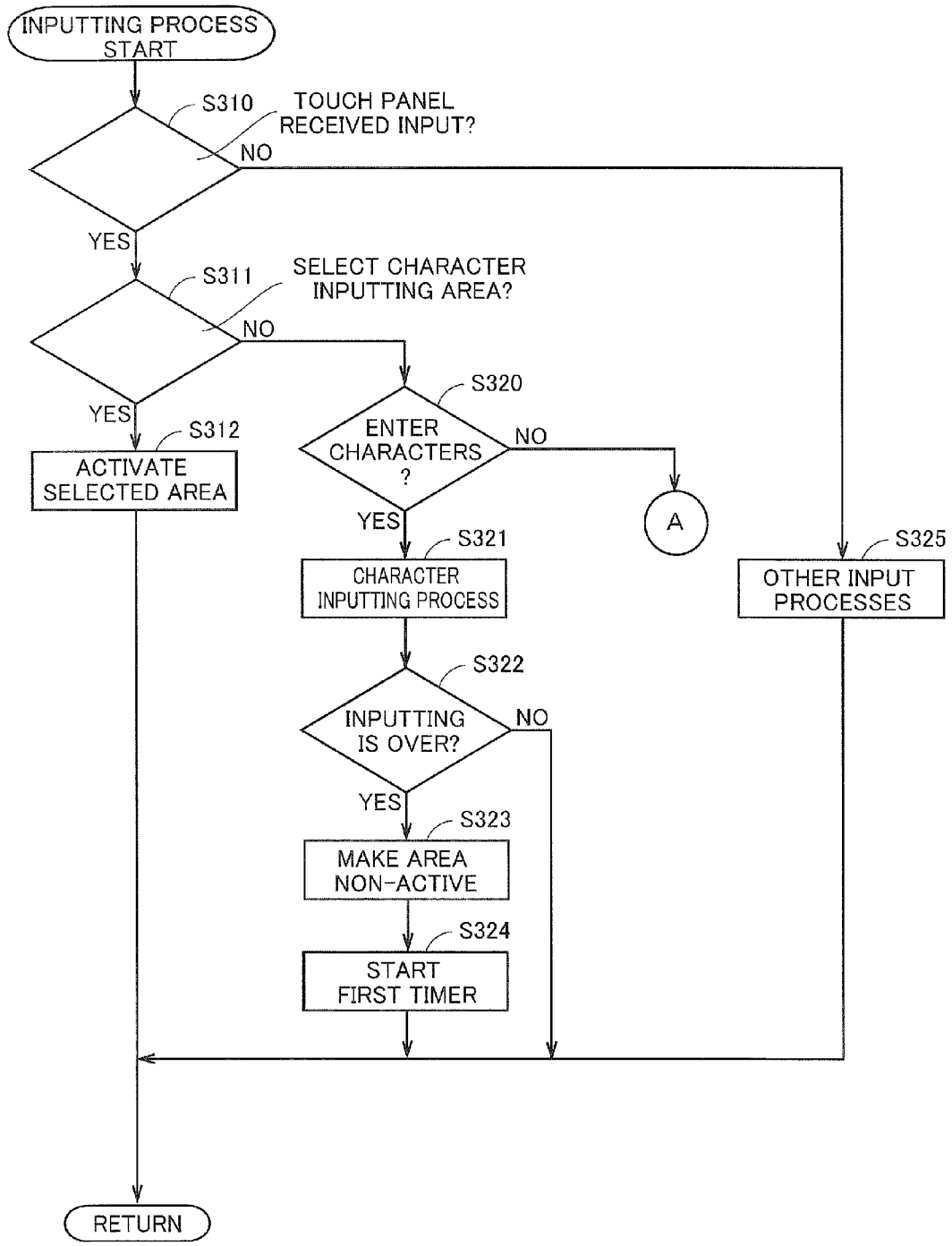
FIGS. 12 and 13 show a subroutine of the inputting process of step S300 in FIG. 11.
Figure 13:
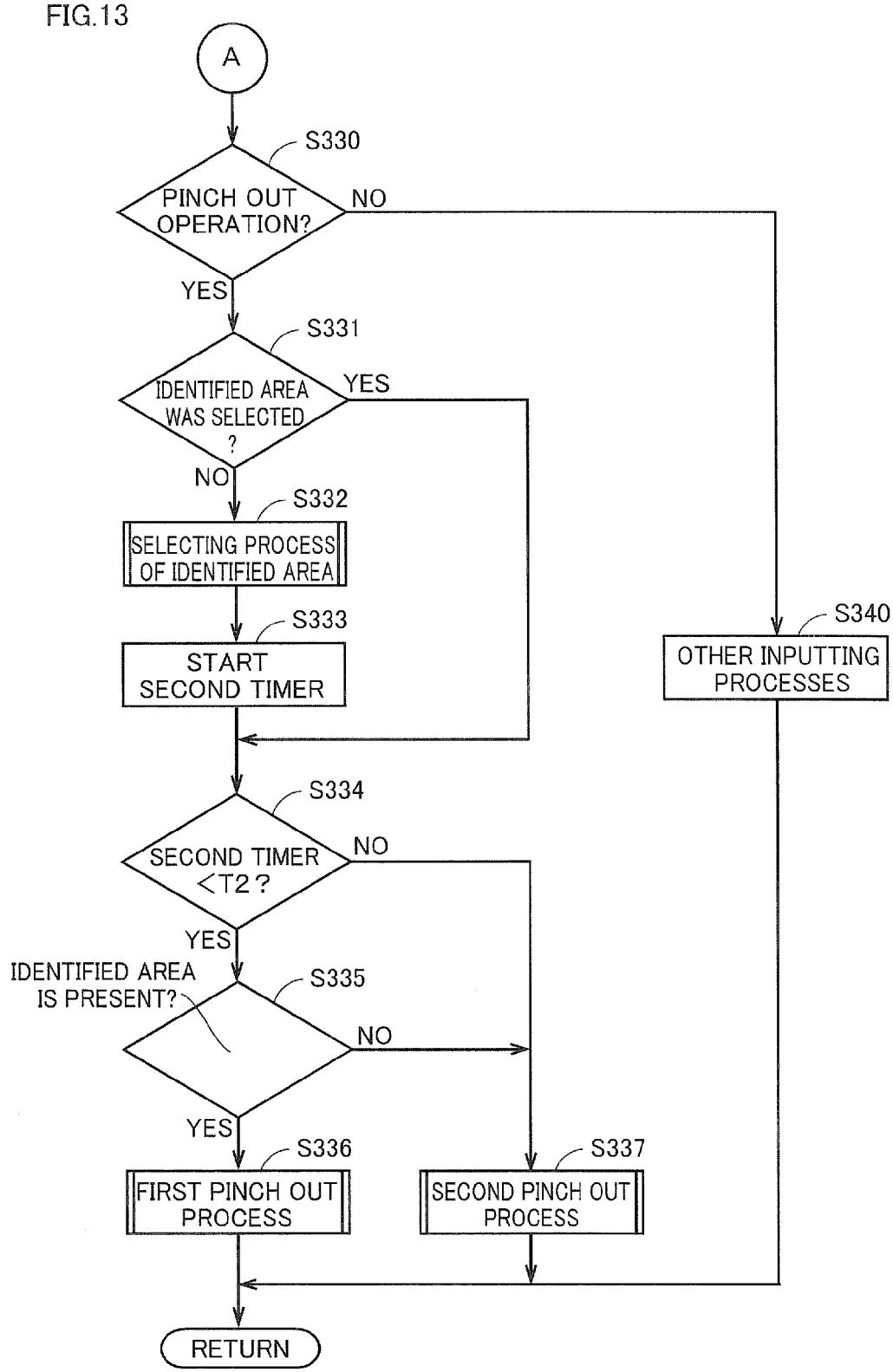

FIGS. 12 and 13 show a subroutine of the inputting process of step S300 in FIG. 11.

Referring to FIG. 12, at the inputting process of step S300, CPU 101 determines whether touch panel 220 received input or not. (S310).

At step S310, in case that CPU 101 determined that touch panel 220 received input (YES at S310), CPU 101 determines whether the input received by touch panel 220 is for selecting a character inputting area or not (S311). On the other hand, in case that CPU 101 determined that touch panel 220 did not receive input (NO at S310), CPU 101 executes other input processes (for example, the process based on pressing of hardware keys) (S325), and returns to the main routine.

At step S311, in case that CPU 101 determined that the input of touch panel 220 is to select a character inputting area (YES at S311), CPU 101 activates the selected character inputting area. Herewith, CPU 101 puts the screen into a state in which a user can input characters (S312), and returns to the main routine.

At step S311, in case that CPU 101 determined that the input of touch panel 220 is not to select a character inputting area (NO at S311), CPU 101 determines whether the input of touch panel 220 is for entering characters or not (S320).

At step S320, in case that CPU 101 determines that the input of touch panel 220 is for entering characters (YES at S320), CPU 101 executes a character inputting process (S321), and determines whether the character inputting is over or not (S322). On the other hand, at step S320, in case that CPU 101 determines that the input of touch panel 220 is not for entering characters (NO at S320). CPU 101 steps in step S330 in FIG. 13.

At step S322, in case that CPU 101 determined that the character inputting is over (YES at S322), CPU 101 makes the character inputting area non-active, and puts the screen into a state in which a user can not input characters (S323). Next, CPU 101 starts the first timer for measuring elapsed time after completion of the character inputting (S324), and returns to the main routine. On the other hand, at step S322, in case that CPU 101 determined that the character inputting is not over (NO at S322), CPU 101 returns to the main routine.

Referring to FIG. 13, CPU 101 determines whether the input of touch panel 220 is a pinch out operation or not (S330).

At step S330, in case that CPU 101 determines that the input of touch panel 220 is a pinch out operation (YES at S330), CPU 101 determines whether the identified area as for the received pinch out operation was selected or not (S331). On the other hand, at step S330, in case that CPU 101 determines that the input of touch panel 220 is not a pinch out operation (NO at S330), CPU 101 executes other inputting processes (S340) and returns to the main routine.

At step S331, in case that CPU 101 determines that the identified area as for the received pinch out operation was selected (YES at S331), CPU 101 steps in the process of step S334. On the other hand, at step S331, in case that CPU 101 determines that the identified area as for the received pinch out operation was not selected (NO at S331), CPU 101 executes the selecting process of the new identified area (S332). Next, CPU 101 starts the second timer for measuring elapsed time from the beginning of the pinch out operation (S333), and steps in the process of step S334.

At step S334, CPU 101 determines whether the time of the second timer is less than time T2 (time T2 is an arbitrary value) or not (S334). At step S334, in case that CPU 101 determined that the time of the second timer is less than time T2 (YES at S334), CPU 101 determines whether the identified area is selected or not, referring to the flag indicating the presence of the identified area (S335).

At step S335, in case that CPU 101 determined that the identified area is selected (YES at S335), CPU 101 executes the first pinch out process adopting the first enlarged display method (S336), and returns to the main routine.

At step S344, in case that CPU 101 determined that the time of the second timer is more than or equal to time T2 (NO at S334) or determined the identified area is not selected (NO at S335), CPU 101 executes the second pinch out process adopting the second enlarged display method (S337), and returns to the main routine.

Figure 14:
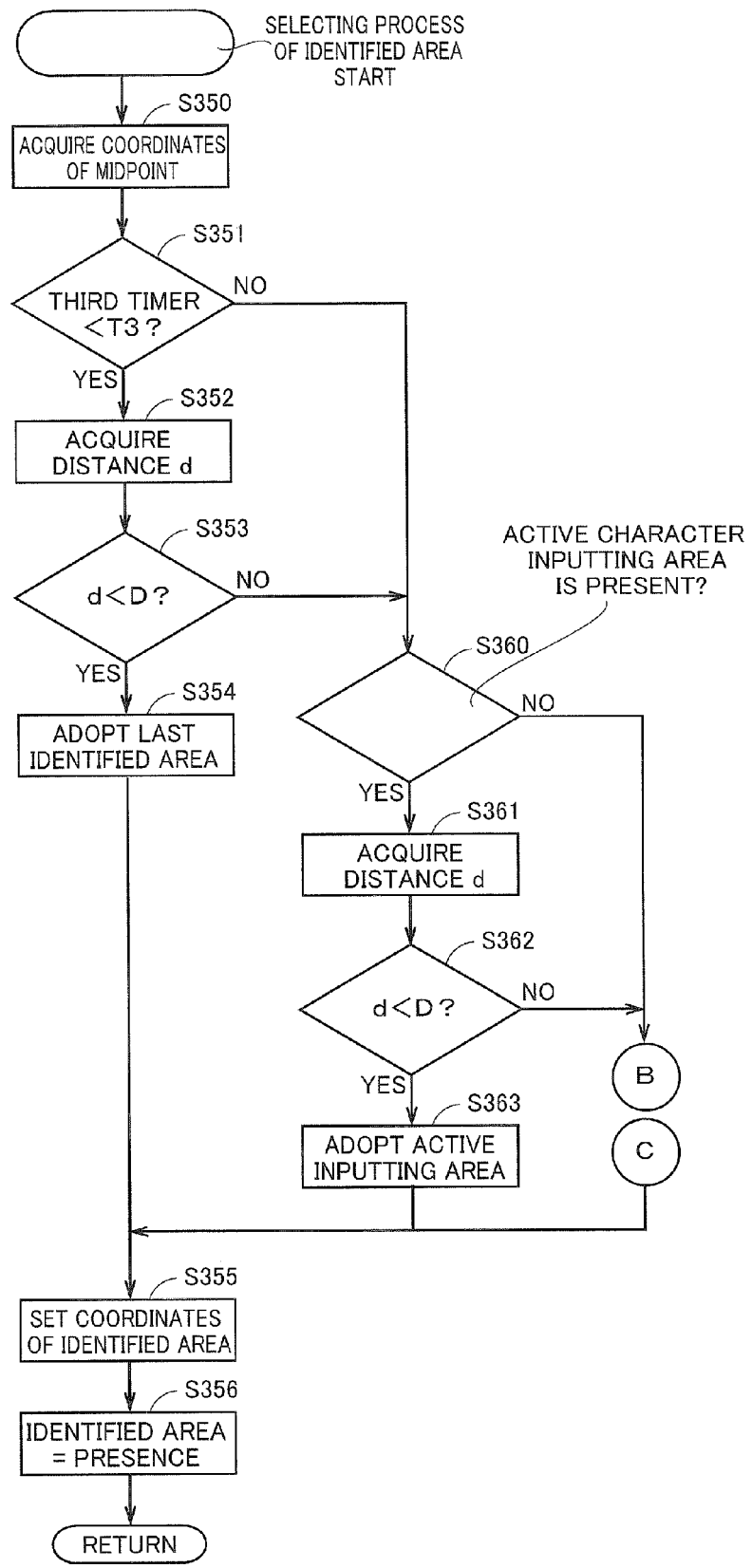
FIGS. 14 and 15 show a subroutine of selecting process of the identified area of step S332 in FIG. 13.
Figure 15:
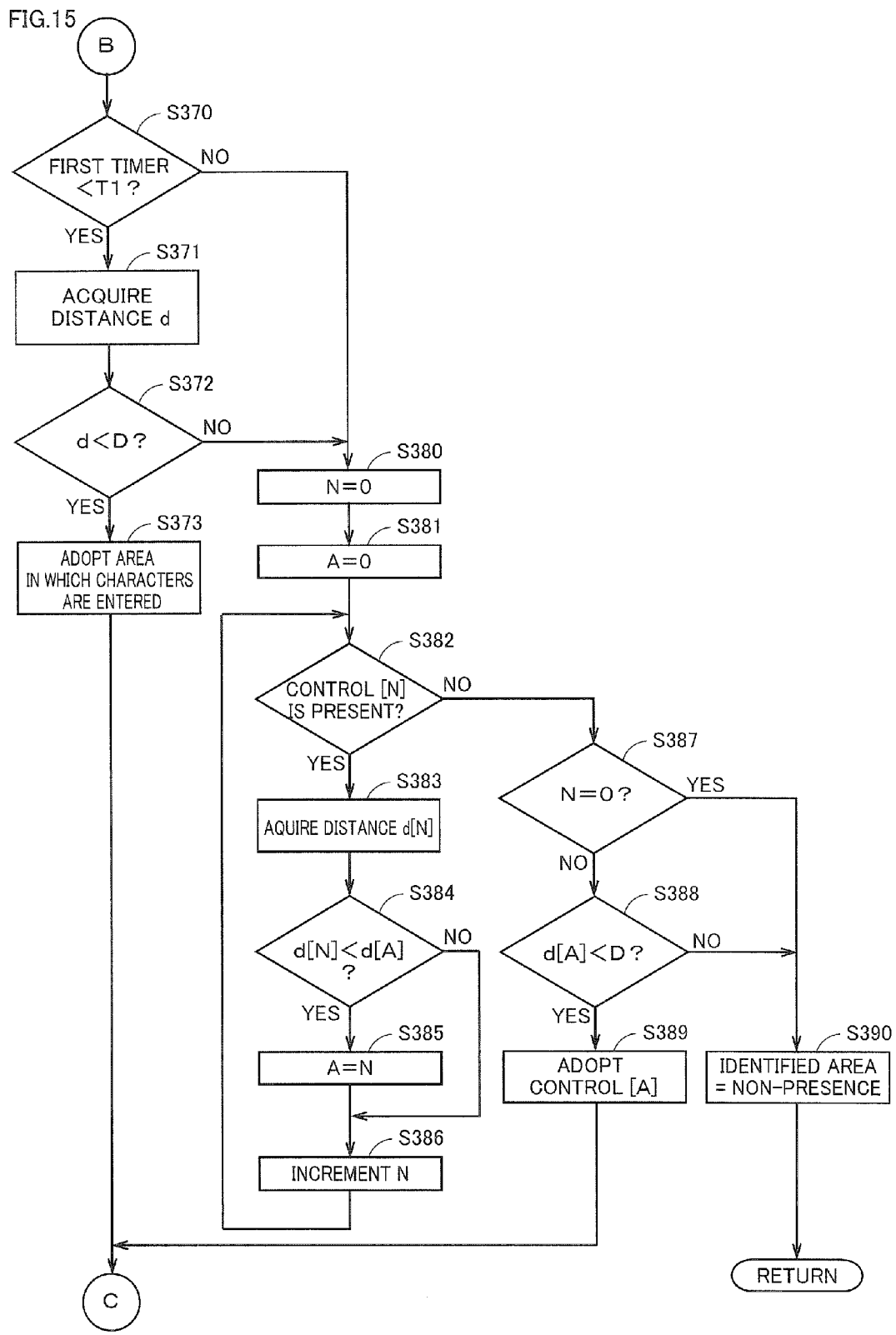

FIGS. 14 and 15 show a subroutine of selecting process of the identified area of step S332 in FIG. 13.

Referring to FIG. 14, in the identified area selecting process at step S332, CPU 101 acquires the coordinates of the midpoint of the pinch out operation (S350). CPU 101 determines whether the time of the third timer measuring the elapsed time from completion of the last pinch out operation is less than time T3 (time T3 is an arbitrary value) or not (S351).

At step S351, in case that CPU 101 determines that the time of the third timer is less than time T3 (YES at S351), CPU 101 acquires the distance d between the identified area selected last time and the midpoint P of the pinch out operation (S352). CPU 101 determines whether distance d between the identified area selected last time and the midpoint P of the pinch out operation is less than prescribed value D or not (S353).

At step S353, in case that CPU 101 determined that distance d between the identified area selected last time and the midpoint P of the pinch out operation is less than prescribed value D (YES at S353), CPU 101 adopts the first selecting method, selects the identified area selected last time as the identified area (S354), and steps in the process of step S355.

At step S351, in case that CPU 101 determined that the time of the third timer is more than or equal to time T3 (NO at S351), or distance d between the identified area selected last time and the midpoint P of the pinch out operation is more than or equal to prescribed value D (NO at S353), CPU 101 determines whether there is an active character inputting area or not (S360).

At step S360, in case that CPU 101 determined there is an active character inputting area (YES at S360), CPU 101 acquires distance d between the character inputting area and the midpoint P of the pinch out operation (S361). CPU 101 determines whether distance d between the character inputting area and the midpoint P of the pinch out operation is less than prescribed value D or not (S362).

At step S362, in case that CPU 101 determined that distance d between the character inputting area and the midpoint P of the pinch out operation is less than prescribed value D (YES at S362), CPU 101 adopts the second selecting method, selects the active area as the identified area (S363), and steps in the process of step S355.

At step S360, in case that CPU 101 determined that there is not an active character inputting area (NO at S360), or distance d between the character inputting area and the midpoint P of the pinch out operation is more than or equal to prescribed value D (NO at S362), CPU 101 steps in the process of step S370 of FIG. 15.

At step S355, CPU 101 sets the center of the enlargement as the coordinates of the identified area (S355), sets the flag relating to the presence of the identified area (S356), and returns to the main routine.

Referring to FIG. 15, at step S370, CPU 101 determines whether the time of the first timer is less than time T1 (time T1 is an arbitrary value) or not (S370).

At step S370, in case that CPU 101 determined that the time of the first timer is less than time T1 (YES at S370), CPU 101 acquires distance d between the area in which characters are entered and the midpoint P of the pinch out operation (S371), and determines whether distance d between the area in which characters are entered and the midpoint P of the pinch out operation is less than prescribed value D or not (S372).

At step S372, in case that CPU 101 determined that distance d between the area in which characters are entered and the midpoint P of the pinch out operation is less than prescribed value D (YES at S372), CPU 101 adopts the third selecting method, selects the area in which characters are entered as the identified area (S373), steps in the process of step S355 of FIG. 14.

At step S370, in case that CPU 101 determined that the time of the first timer is more than or equal to time T1 (NO at S370), or determined distance d between the area in which characters are entered and the midpoint P of the pinch out operation is more than or equal to prescribed value D (NO at S372), CPU 101 recognizes the control nearest from the midpoint P of the pinch out operation, as a candidate for the identified area. Namely, CPU 101 initializes variable N relating to a control number by 0 (S380), and initializes control number A which corresponds to the control being a candidate for the identified area, by 0 (S381). Next, CPU 101 determines whether there is a control wherein the control number is N or not (hereinafter, a control having control number N may be referred to as "control [N]", and a control being a candidate for the identified area may be referred to as "control [A]").

At step S382, in case that CPU 101 determined that there is the control wherein the control number is N (YES at S382), CPU 101 acquires distance d [N] between control [N] and the midpoint P of the pinch out operation (S383). CPU 101 determines whether distance d [N] is less than distance d [A], wherein distance d [A] is the distance between control [A] and the midpoint P of the pinch out operation (S384).

At step S384, in case that CPU 101 determined that distance d [N] is less than distance d [A] (YES at S384), the present control [N] is nearer to the midpoint P of the pinch out operation, rather than control [A]. In this situation, CPU 101 sets control [N] as control [A] (S385) and steps in the process of step S386. On the other hand, in case that CPU 101 determined that distance d [N] is more than or equal to distance d [A] (NO at S384), CPU 101 steps in the process of step S386.

At step S386, CPU 101 increments the N (S386), and steps in the process of step S382.

At step S382, in case that CPU 101 determined that there is not the control wherein the control number is N (NO at S382), CPU 101 determines whether the present control number N is zero or not (S387).

At step S387, in case that CPU 101 determined that the present control number N is zero (YES at S387), it means that the present operation screen does not include controls. In this case, CPU 101 clears the flag relating to the presence of the identified area (S390), and returns to the main routine.

At step S387, in case that CPU 101 determined the present control number N is not zero (NO at S387), CPU 101 determines whether distance d [A] between control [A] and the midpoint P of the pinch out operation is less than prescribed value D or not (S388).

At step S388, in case that CPU 101 determined that distance d [A] is less than prescribed value D (YES at S388), CPU 101 adopts the fourth selecting method, selects control [A] as the identified area (S389), and steps in the process of step S355 in FIG. 14.

At step S388, in case that CPU 101 determined that distance d [A] is more than or equal to prescribed value D (NO at S388), CPU 101 clears the flag relating to the presence of the identified area (S390), and returns to the main routine.

Figure 16:
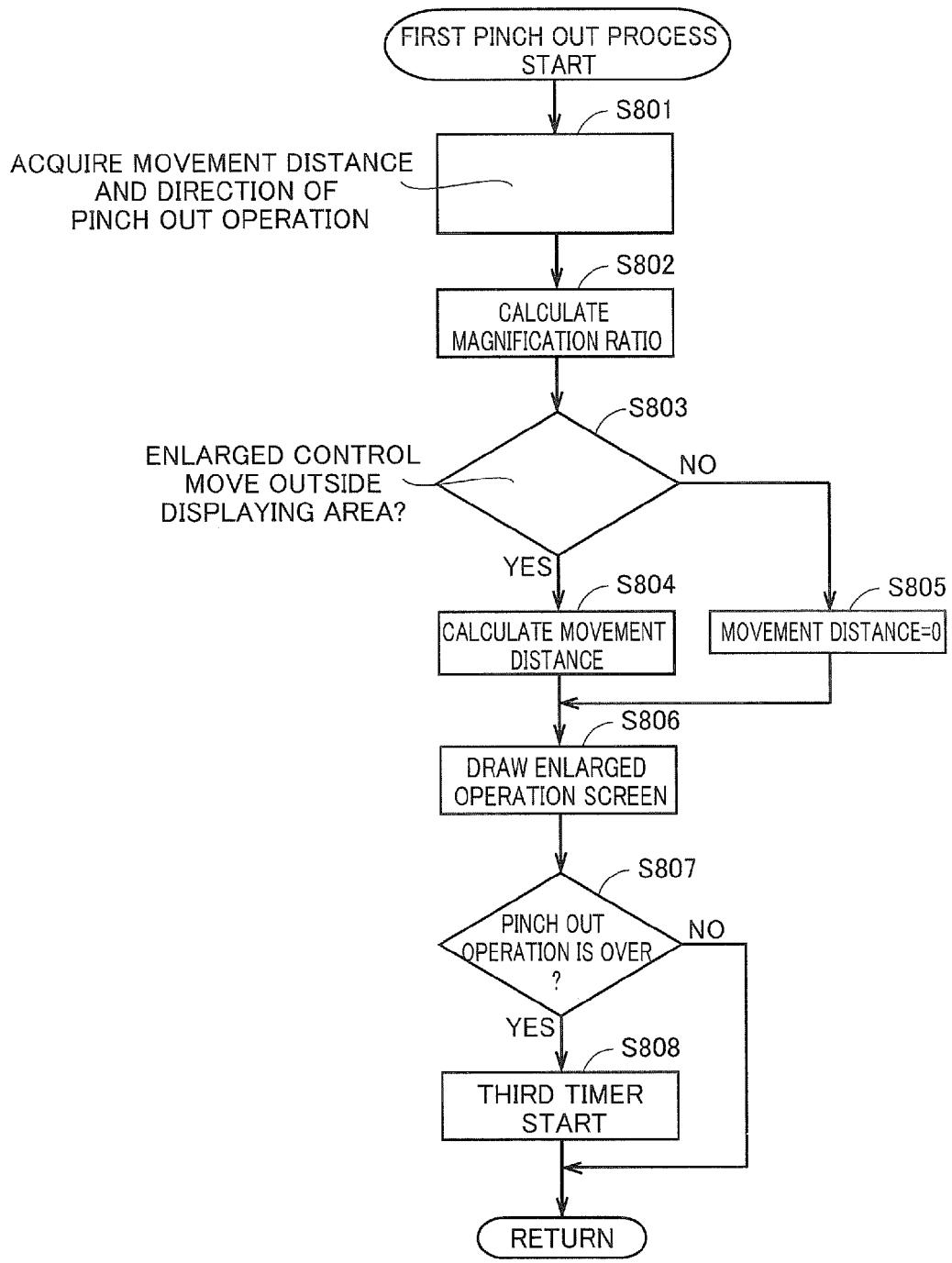
FIG. 16 shows a subroutine of the first pinch out process of step S336 in FIG. 13.

FIG. 16 shows a subroutine of the first pinch out process of step S336 in FIG. 13.

Referring to FIG. 16, in the first pinch out process of step S336. CPU 101 acquires two vectors of the pinch out operation (the movement distance and direction) (S801). CPU 101 extracts the vector of the enlargement component from the two vectors. CPU 101 calculates the enlargement factor (the magnification ratio) based on the magnitude of the vector of the enlargement component (S802). Next, CPU 101 determines whether the control will move outside of the displaying area of touch panel 220 or not, if the control is enlarged as the center of the enlargement at the calculated enlargement factor (S803).

At step S803, in case that CPU 101 determined that the control as the center of the enlargement will move outside of the displaying area (YES at S803), CPU 101 calculates the movement distance (which is the distance for a move of the center of the enlargement from the identified area), so that all of the control as the center of the enlargement is displayed in the displaying area, based on the protrusive amount (S804). Then, CPU 101 steps in the process of step S806. On the other hand, at step S803, in case that CPU 101 determined the control as the center of the enlargement will not move outside of the displaying area (NO at S803), CPU 101 sets the movement distance as zero (the center of the enlargement is not moved from the identified area) (S805), and steps in the process of step S806.

At step S806, CPU 101 draws the enlarged operation screen on touch panel 220 based on the enlargement factor and the movement distance (S806). Next, CPU 101 determines whether the pinch out operation is over or not (S807).

At step S807, in case that CPU 101 determined that the pinch out operation is over (YES at S807), CPU 101 starts the third timer (S808), and returns to the main routine. On the other hand, in case that CPU 101 determined that the pinch out operation is not over (NO at S807), CPU 101 returns to the main routine.

Figure 17:
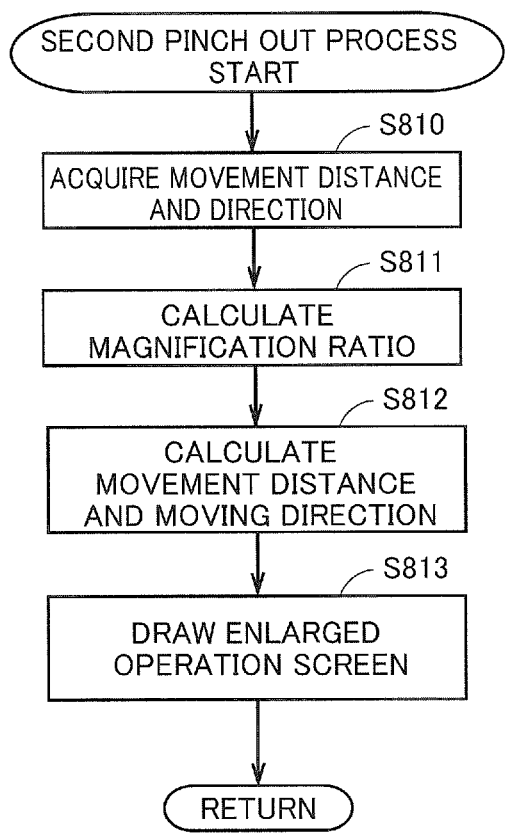
FIG. 17 shows a subroutine of the second pinch out process of step S337 in FIG. 13.

FIG. 17 shows a subroutine of the second pinch out process of step S337 in FIG. 13.

Referring to FIG. 17, in the second pinch out process of step S337, CPU 101 acquires two vectors of the pinch out operation (the movement distance and direction) (S810). CPU 101 extracts the vector of the enlargement component from the two vectors. CPU 101 calculates the enlargement factor (the magnification ratio) based on the magnitude of the vector of the enlargement component (S811). Next, CPU 101 extracts the vector of the movement component from the two vectors. CPU 101 calculates the movement distance and moving direction, based on the magnitude of the vector of the movement component (S812). CPU 101 draws the enlarged operation screen on touch panel 220 based on the enlargement factor, the movement distance and moving direction (S813), and returns to the main routine.

[Modification]

Figure 18:
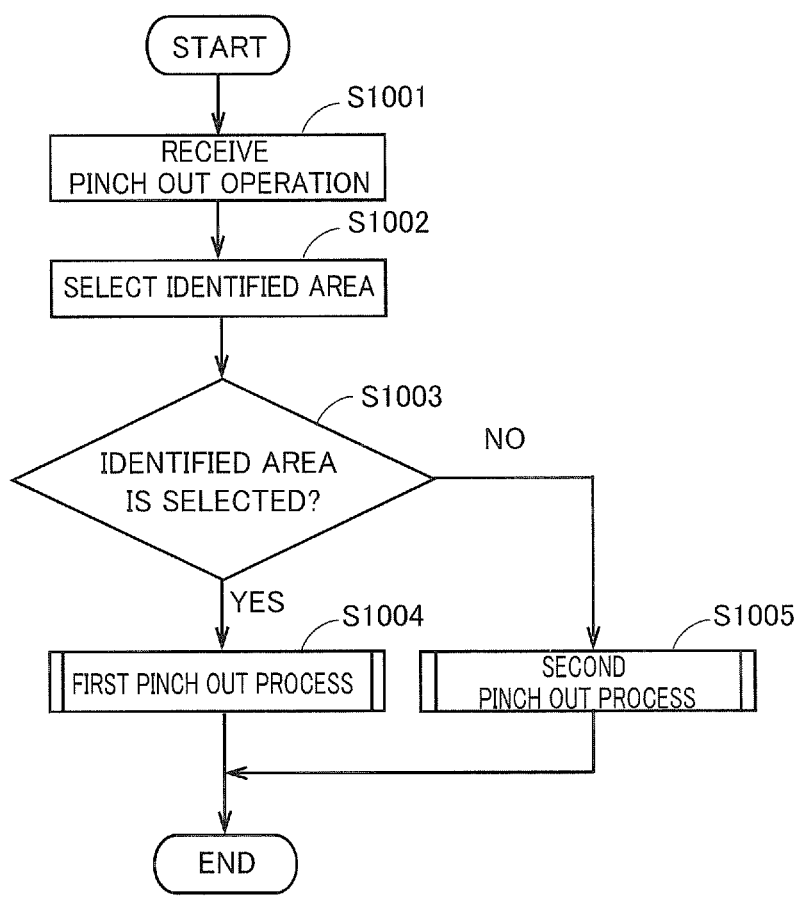
FIG. 18 shows the modification of the flowchart of behavior of image forming apparatus 1 of the embodiment of this invention.

FIG. 18 shows the modification of the flowchart of behavior of the image forming apparatus 1 of the embodiment of this invention.

Referring to FIG. 18, when CPU 101 receives a pinch out operation on touch panel 220 (S1001), CPU 101 selects the identified area (S1002), and steps in the process of step S1003.

At step S1002, the identified area is selected by one of the first to the fourth selecting methods. For example, CPU 101 may select the area previously selected as the identified area by the first selecting method. CPU 101 may select the active area as the identified area by the second selecting method. CPU 101 may select the area in which characters are entered as the identified area by the third selecting method. CPU 101 may select the control wherein distance d between the control and the midpoint P of the pinch out operation is the shortest, as the identified area by the fourth selecting method. The identified area may be selected adopting more than one of the first to the fourth selecting methods above. In this case, the priority order of the adopted selecting methods is arbitrary. Further, at step S1002, the first to the fourth selecting methods may be not adopted. For example, an arbitrary control wherein the distance between the control and the midpoint of the pinch out operation is less than a prescribed value in the image displayed on the displaying screen may be selected as the identified area.

At step S1003, CPU 101 determines whether the identified area is selected or not (S1003).

At step S1003, in case that CPU 101 determined that the identified area is selected (YES at S1003), CPU 101 executes the subroutine of the first pinch out process shown in FIG. 16 (S1004), and terminates the process. On the other hand, at step S1003, in case that CPU 101 determined that the identified area is not selected (NO at S1003), CPU 101 executes the subroutine of the second pinch out process shown in FIG. 17 (S1005), and terminates the process.

[Advantages of the Embodiments]

According to the embodiments, a displaying device which can properly enlarge and display an image is provided.

According to the above embodiments, when the distance between the identified area and the midpoint of the pinch out operation is less than a prescribed value, the image is enlarged around the center of the enlargement as the identified area. When the distance between the identified area and the midpoint of the pinch out operation is more than a prescribed value, the image is enlarged around the center of the enlargement as the point away from the midpoint of the pinch out operation. The direction from the midpoint to the center of the enlargement is decided based on the displacement of the contact points of the pinch out operation. The distance between the midpoint and the center of the enlargement is decided based on the displacement of the contact points of the pinch out operation. Herewith, an image can properly be enlarged around the center of the enlargement as the point the user desired. Then, the operability is improved.

[Others]

According to the above embodiments, the behavior of image forming apparatus 1 received the pinch out operation on touch panel 220 of portable telecommunication terminal device 2 was explained. Image forming apparatus 1 may exhibit the same behavior when receiving a pinch out operation on touch panel 131 of operation panel 130. Portable telecommunication terminal device 2 may exhibit the same behavior instead of image forming apparatus 1, when a pinch out operation is received on touch panel 220 of portable telecommunication terminal device 2.

Objects other than controls (for example, tables or specific characters displayed on the displaying screen) may be selected as the identified area. The selecting method of the identified area is arbitrary. For example, the smallest control being displayed within a prescribed distance from the midpoint P of the pinch out operation etc. may be selected as the identified area.

The above embodiments can be combined with each other. For example, it is assumed that the image is enlarged shifting the center of the enlargement, to display all of the identified area on the display screen, in case that a part of the identified area will move outside of the displaying screen when enlarging at an enlargement factor based on the pinch out operation. In this condition, when the time elapsed from the beginning of the pinch out operation is more than or equal to a predetermined time, image forming apparatus may switch to the second enlarged display method.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. A displaying device comprising:
    an image display unit for displaying an image on a displaying screen;
    a touch panel for receiving a pinch out operation in which two contact points contact with the displaying screen and the two contact points move away from each other, when the image display unit displays the image; and
    a processor;
    wherein the processor is configured to:
    determine whether there is an identified area in the image or not, in case that the pinch out operation is received;
    enlarge the image around a center of the enlargement in the identified area, in case that there is the identified area in the image;
    enlarge the image around a center of the enlargement as a point moved from a midpoint of the pinch out operation in a direction determined based on displacement of the two contact points, a distance of the movement is determined based on displacement of the two contact points, in case that there is not the identified area in the image; and
    select a control as the identified area from among controls in the image, the distance between the midpoint of the pinch out operation and the selected control is less than a prescribed value,
    wherein the processor determines that there is the identified area, in case that the control is selected, and the processor determines that there is not the identified area, in case that the control is not selected.

2. The displaying device according to claim 1, wherein the processor selects at least one of a software key which a user can operate and an area in which a user can enter characters, as the identified area.

3. The displaying device according to claim 1, wherein the processor selects the control nearest from the midpoint of the pinch out operation, as the identified area.

4. The displaying device according to claim 1, wherein the processor selects an area in which characters were entered, as the identified area.

5. The displaying device according to claim 1, wherein the processor selects an area previously selected, as the identified area.

6. The displaying device according to claim 1, wherein the processor selects an active area, as the identified area.

7. The displaying device according to claim 1, wherein the processor shifts the center of the enlargement so that all of the identified area can be displayed in the displaying screen, in case that a part of the identified area moves outside of the displaying screen by enlarging the image at an enlarging factor based on the pinch out operation.

8. The displaying device according to claim 1, wherein the processor enlarges the image around a center of the enlargement as a point moved from a midpoint of the pinch out operation in a direction determined based on displacement of the two contact points, a distance of the movement is determined based on displacement of the two contact points, in case that the time elapsed from the beginning of the pinch out operation is more than or equal to a predetermined time in a state of the pinch out operation, even if the processor determines that there is the identified area.

9. A method of controlling a displaying device having an image display unit for displaying an image on a displaying screen, comprising the processes to:

receive a pinch out operation in which two contact points contact with the displaying screen and the two contact points move away from each other, when the image display unit displays the image;

determine whether there is an identified area in the image or not, in case that the pinch out operation is received;

enlarge the image around a center of the enlargement in the identified area, in case that there is the identified area in the image;

enlarge the image around a center of the enlargement as a point moved from a midpoint of the pinch out operation in a direction determined based on displacement of the two contact points, a distance of the movement is determined based on displacement of the two contact points, in case that there is not the identified area in the image; and select a control as the identified area from among controls in the image, the distance between the midpoint of the pinch out operation and the selected control is less than a prescribed value, wherein the method determines that there is the identified area, in case that the control is selected, and the method determines that there is not the identified area, in case that the control is not selected.

10. A non-transitory computer-readable recording medium encoded with a control program for a displaying device having an image display unit for displaying an image on a displaying screen, the control program causing a computer to execute the processes to:

receive a pinch out operation in which two contact points contact with the displaying screen and the two contact points move away from each other, when the image display unit displays the image;

determine whether there is an identified area in the image or not, in case that the pinch out operation is received;

enlarge the image around a center of the enlargement in the identified area, in case that there is the identified area in the image;

enlarge the image around a center of the enlargement as a point moved from a midpoint of the pinch out operation in a direction determined based on displacement of the two contact points, a distance of the movement is determined based on displacement of the two contact points, in case that there is not the identified area in the image; and select a control as the identified area from among controls in the image, the distance between the midpoint of the pinch out operation and the selected control is less than a prescribed value, wherein the computer determines that there is the identified area, in case that the control is selected, and the computer determines that there is not the identified area, in case that the control is not selected.

11. The non-transitory computer-readable recording medium according to claim 10, wherein the computer selects at least one of a software key which a user can operate and an area in which a user can enter characters, as the identified area.

12. The non-transitory computer-readable recording medium according to claim 10, wherein the computer selects the control nearest from the midpoint of the pinch out operation, as the identified area.

13. The non-transitory computer-readable recording medium according to claim 10, wherein the computer selects an area in which characters were entered, as the identified area.

14. The non-transitory computer-readable recording medium according to claim 10, wherein the computer selects an area previously selected, as the identified area.

15. The non-transitory computer-readable recording medium according to claim 10, wherein the computer selects an active area, as the identified area.

16. The non-transitory computer-readable recording medium according to claim 10, wherein the computer shifts the center of the enlargement so that all of the identified area can be displayed in the displaying screen, in case that a part of the identified area moves outside of the displaying screen by enlarging the image at an enlarging factor based on the pinch out operation.

17. The non-transitory computer-readable recording medium according to claim 10, wherein the processor enlarges the image around a center of the enlargement as a point moved from a midpoint of the pinch out operation in a direction determined based on displacement of the two contact points, a distance of the movement is determined based on displacement of the two contact points, in case that the time elapsed from the beginning of the pinch out operation is more than or equal to a predetermined time in a state of the pinch out operation, even if the processor determines that there is the identified area.

18. A displaying system including a display device and a display terminal device which can communicate with the display device comprising:

an image display unit for displaying an image on a displaying screen of the display terminal device;

a touch panel for receiving a pinch out operation in which two contact points contact with the displaying screen and the two contact points move away from each other, when the image display unit displays the image; and a processor;

wherein the processor is configured to:

determine whether there is an identified area in the image or not, in case that the pinch out operation is received;

enlarge the image on the displaying screen, around a center of the enlargement in the identified area, in case that there is the identified area in the image;

enlarge the image on the displaying screen, around a center of the enlargement as a point moved from a midpoint of the pinch out operation in a direction determined based on displacement of the two contact points, a distance of the movement is determined based on displacement of the two contact points, in case that there is not the identified area in the image; and select a control as the identified area from among controls in the image, the distance between the midpoint of the pinch out operation and the selected control is less than a prescribed value, wherein the processor determines that there is the identified area, in case that the control is selected, and the processor determines that there is not the identified area, in case that the control is not selected.

* * * * *